Sept. 11, 1962 P. BARTON 3,053,403
APPARATUS FOR STORING AND HANDLING MATERIALS
Filed May 4, 1961 4 Sheets-Sheet 1

United States Patent Office 3,053,403
Patented Sept. 11, 1962

3,053,403
APPARATUS FOR STORING AND HANDLING
MATERIALS
Peter Barton, 11 Hintlesham Ave., Edgbaston,
Birmingham, England
Filed May 4, 1961, Ser. No. 107,797
Claims priority, application Great Britain May 21, 1960
6 Claims. (Cl. 214—16.4)

The present invention has relation to the stacking or storage of metal rods and other members utilised in engineering workshops and the like.

It has been usual to place metal rods and other engineering products in pallets, containers or frames (hereinafter referred to as pallets) which were stacked one above the other for convenience but experience proved that the contents of a lower pallet were often required which meant the removal of heavily laden upper pallets with consequent time wastage and the present invention has for its object primarily to overcome this deficiency and render all pallets readily accessible.

According to the present invention wheeled provision is provided on or in connection with a lower pallet which is normally installed in a gantry or super-structure and means are provided thereon for raising any one or more of the pallets stacked in the gantry or super-structure and mechanically displacing the lower pallet or pallets on or in connection with the wheels and which pallet or pallets is or are relieved of the weight of the upper pallet or pallets so that the contents of a lower pallet are readily accessible.

Further according to the present invention there is provided a plurality of stacked pallets; the lowermost of which is provided or associated with wheels for its displacement with or without certain or all of the stacked pallets and means are provided upon or in connection with a gantry or structure wherein the stacked pallets are accommodated for sequentially raising the pallets from the uppermost one downwardly from a suitable controlled power source so that any particular pallet can be suspended or supported leaving the lower pallet or pallets to be moved on its wheels.

Conveniently a roller track is mounted upon the ground leading to and continuing within a rectangular gantry having mechanically operated lifting gear on its upper part and interengageable pallets are socketed into one another vertically, the lower resting on the rollers in such a manner that the lifting gear may raise a certain number of pallets with their goods and that pallet beneath or those pallets beneath moved on the rollers by a hydraulic ram or other power gear so that the contents of the upper pallets are exposed for use.

In another embodiment the superimposed pallets may fulcrum upon a fixed structure at their rear extremities and be mechanically lifted at their front extremities in sequence from the uppermost pallet so that when the desired pallet or desired number of pallets have been raised on their rear fulcrums the remaining pallets can be readily withdrawn manually or by a suitable power source so that access can be readily had to the contents of the uppermost displaced pallet. Here again it is advisable for an upper pallet to socket into a lower pallet for location purposes. The superimposed pallets resting upon one another may be raised in sequence from the upper part of a structure by ladder-like devices which engage projections on the pallets so that by the upward movement of the ladder-like device an upper pallet is slightly lifted and then the remaining pallets are lifted in sequence. The lifting operation being stopped, a desired pallet or pallets can be withdrawn to obtain access to the contents of an upper withdrawn pallet. This lifting ladder may be used at the front of the pallets having fulcrums at their rear parts and the pallets may be of that character providing opening for the fork of a lift truck so that the desired goods can be readily removed. If desired instead of providing fulcrum for the pallets at their rear, the pallets may be raised at each extremity by a ladder-like device.

In a still further embodiment the pallets may each carry in pairs a forward and a rearwardly facing hook member of substantially S formation, a plurality of these simulating a suspension chain. Gaps may be left between the co-operative faces of one hook member with that of its upper and lower co-operative hook members, and two pairs of such chain sequences may be employed the one sequence having its hook members raised with respect to the other sequence. With such duplex hook systems pallets may be raised sequentially by a suitably controlled power source by closing the gaps until the desired pallet has been located when owing to its particular gap that pallet and any beneath it can be readily withdrawn on the rollers. Such a mechanism may be completely automatic.

In this invention therefore a stackable pallet is provided with couplings adapted, when several of the pallets are stacked one upon the other, to engage, with a degree of play, complementary couplings of the next adjacent lower and/or upper pallet in the stack and the play in the couplings of each two adjacent pallets is adapted to be taken up in succession from the top to the bottom of the stack by raising the said uppermost pallet so that the raised pallet or pallets is or are clear of the unraised pallet or pallets to enable access to be obtained to the uppermost unraised pallet.

The pallets are interengageable to ensure stacking and are adapted to take or receive the fork of a forked mechanical handling truck or other mechanism for lifting the articles, tubes or rods out of the pallet. In the case of tubes or rods the pallets may be of skelton form so that the forked mechanical handling truck can lift them directly out of the pallet.

In order that the invention may be clearly understood and readily carried into practice reference may be had to the appended explanatory drawings in which:

FIGURE 7 illustrates a plurality of pallets stacked on top of one another and it will be noted that the three upper pallets, $a$, $b$ and $c$ are lifted on their rearward fulcrums $a^1$, $b^1$, $c^1$ so that lower pallets $d$, $e$, and $f$ can be slid on rollers for ready access to the contents in the pallet $d$.

Figure 8:
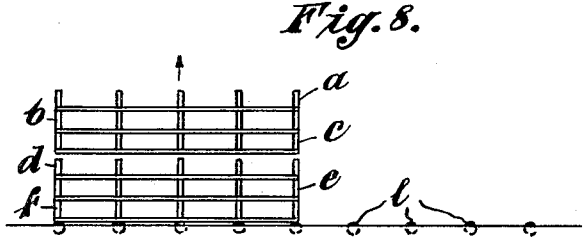
Figure 9:
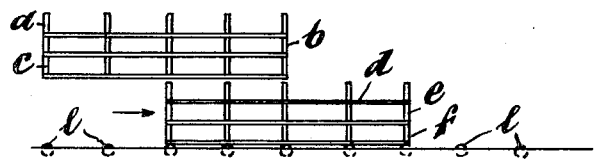

In the FIGURE 8 the rear fulcrum is not employed and it will be noted that the pallets $a$, $b$ and $c$ are raised evenly so that the pallets *d, e* and *f* can be removed on the rollers for gaining access to the pallet *d* and this is particularly identified in the FIGURE 9. The upper pallets *a, b* and *c* in these embodiments are supported by a structure and lifting mechanism which is to be hereinafter more particularly described.

Figures 10, 10A:
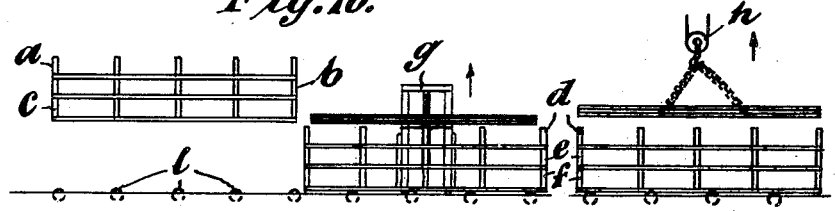

FIGURE 10 shows the fork lift truck *g* removing tubes or the like from the upper pallet *d* and FIGURE 10*a* shows the removal by an overhead conveyor mechanism *h*.

Figure 11:
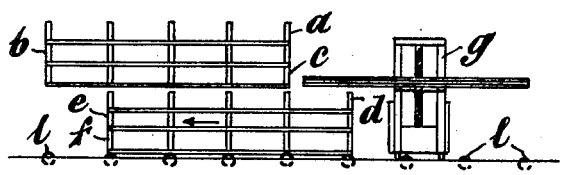
Figure 12:
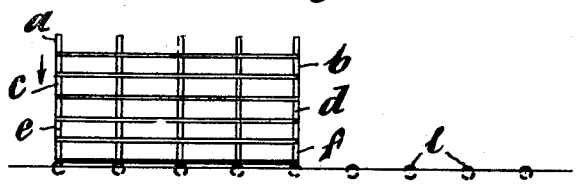

FIGURE 11 shows the removal of the goods from the pallet *d* by the fork truck and the return of the pallets *d, e* and *f* beneath the suspended pallets *a, b* and *c*, and FIGURE 12 shows the pallets restacked.

Although these diagrammatic figures have shown in each instance three pallets withdrawn, it is to be appreciated that viewing FIGURE 8 all pallets *a, b, c, d, e*, and *f* can be withdrawn from the structure hereinafter described so that pallet *a* is accessible or *a* may be suspended, *b, c, d, e* and *f* withdrawn giving access to pallet *b* and so forth.

Figure 1:
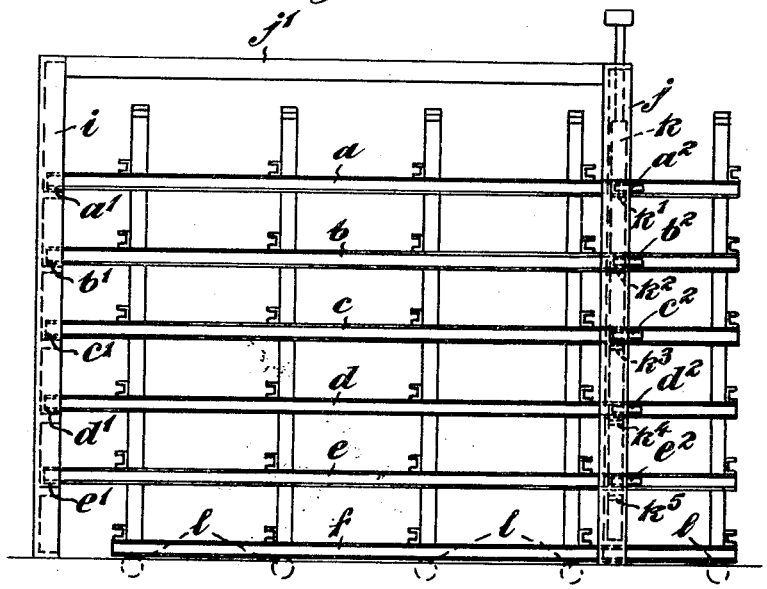
FIGURE 1 illustrates the stacked pallets adapted to fulcrum at their rear or left hand side of the figure and be sequentially raised at the right hand part of the figure by a ladder-like structure hereinafter more particularly described.
Figure 2:
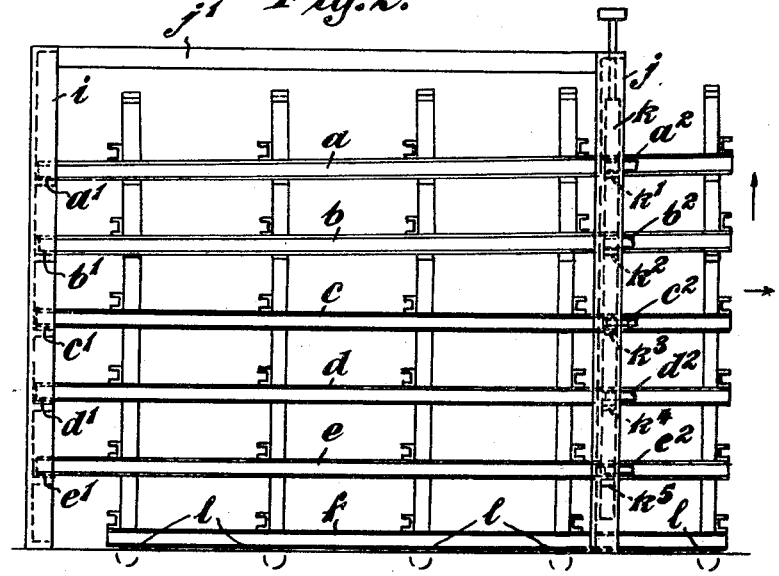
FIGURE 2 is a similar elevation showing the two uppermost pallets being raised so that the four lowermost pallets can be removed on suitable wheels or rollers.

With regard to FIGURE 1 it is to be noted that there is a rear structure *i* and a forward structure *j* and a horizontal structure *j*$^1$ so that an open rectangular boxlike frame is provided.

Figure 3:
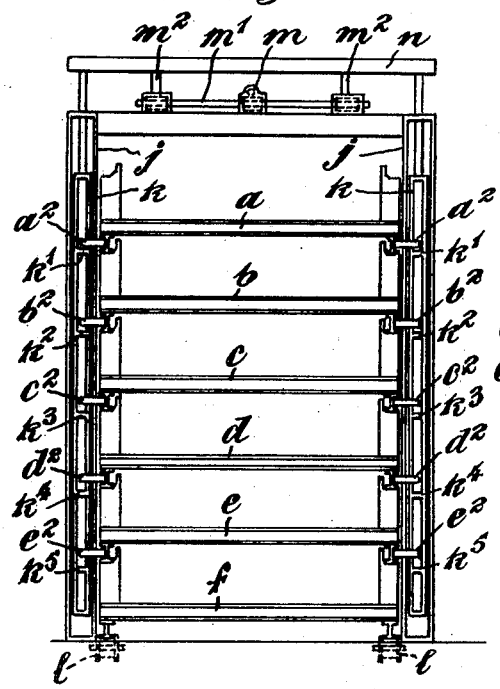
FIGURE 3 is a front elevation of the mechanism shown in FIGURE 1 diagrammatically illustrating the lifting mechanism for the ladder-like structures.
Figure 7:
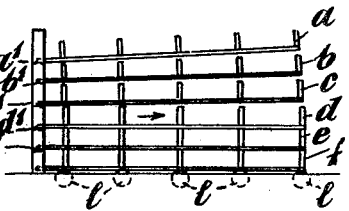
FIGURES 7, 8, 9, 10, 10a, 11 and 12 are diagrammatic views which will now be described with a view to clarifying the operation of the mechanism.
Figure 4:
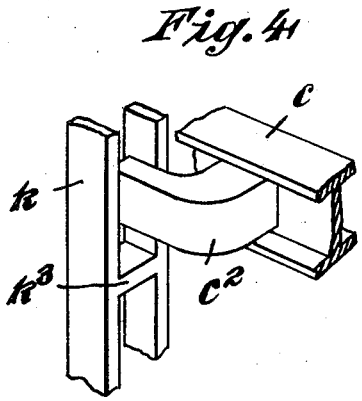
FIGURE 4 illustrates the co-operation of an extremity of a pallet with a section of the ladder-like member.
Figure 5:
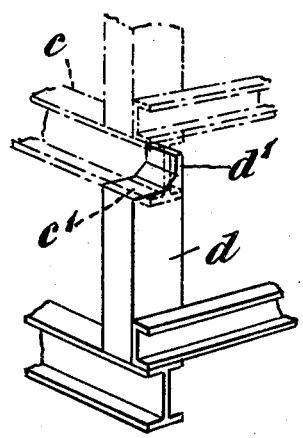
FIGURE 5 illustrates the socketing of one pallet into a lower pallet.

The pallets are shown as in the diagrammatic embodiment FIGURE 7 *a, b, c, d, e, f* and these pallets can fulcrum at *a*$^1$, *b*$^1$, *c*$^1$, *d*$^1$, *e*$^1$. Viewing FIGURES 1 and 3 *k* are the ladder-like structures slidingly guided in the frames *j* and these ladder-like structures have the transverse members *k*$^1$, *k*$^2$, *k*$^3$, *k*$^4$, *k*$^5$ which co-operate with projections *a*$^2$, *b*$^2$, *c*$^2$, *d*$^2$, *e*$^2$ on the respective pallets *a, b, c, d* and *e* and it is to be noted particularly with FIGURE 3 that the gap between *a*$^2$ and *k*$^1$ is considerably less than that between *e*$^2$ and *k*$^5$, the gap increasing slightly in each instance. An initial movement by the ladders contacts projections *a*$^2$ and tilts the pallet *a* on its fulcrum *a*$^1$ so that the weight is taken from pallets *b, c, d* and *f* and these can be readily withdrawn on the rollers *l* to gain access to the pallet *b*. Continued movement of the ladder-like members *k* enables access to be had to any of the other pallets. An upper pallet indicated by *c* in FIGURE 5 has a portion *c*$^1$ which co-engages with the flange *d*$^1$ on a pallet *d* and this obtains on each side of each pallet so that a lower pallet in each instance sockets into or co-engages an upper pallet for purposes of stability.

In each instance it will be noted that the stack of pallets is mounted upon rollers *l* which continue beyond the super-structure, see FIGURES 7 to 12, so that the pallets can be rolled away from the said super-structure manually or by a suitable electrical, hydraulic or other power drive contrived for the purpose. Again, viewing FIGURE 3, a shaft *m* is driven from an electric motor and by suitable gearing is adapted to rotate the shaft *m*$^1$ which again by suitable gearing vertically displaces the small shafts *m*$^2$ which lift the cross bar *n* to which the ladder-like members *k* are attached and electrical equipment is provided in connection with this lifting mechanism employing a sequence of press buttons which enable the electric motor to raise the ladder-like members in correct stages according to the particular press button concerned.

Figure 6:
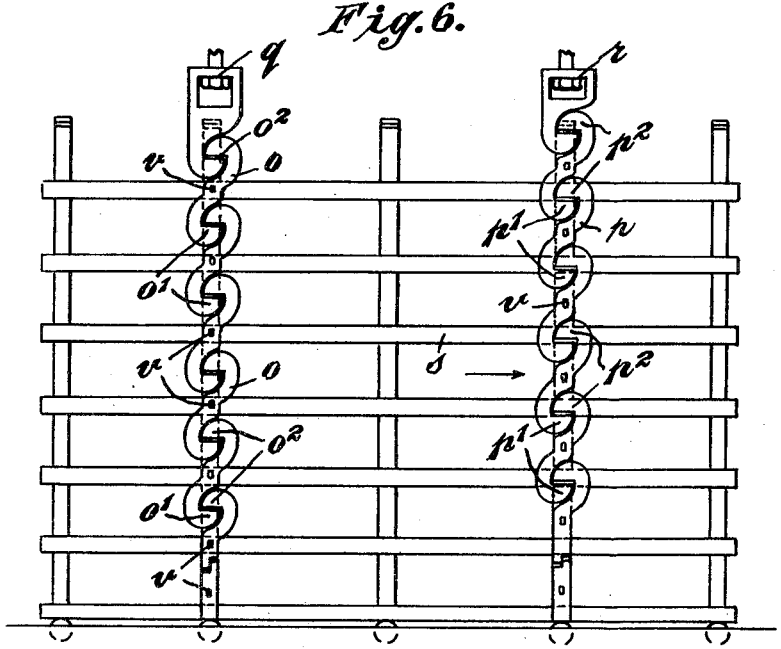
FIGURES 6 and 6a illustrate a modified lifting mechanism enabling sequential lift to be given to upper pallets so that the lower pallet or pallets can be withdrawn on its wheels.
Figure 6A:
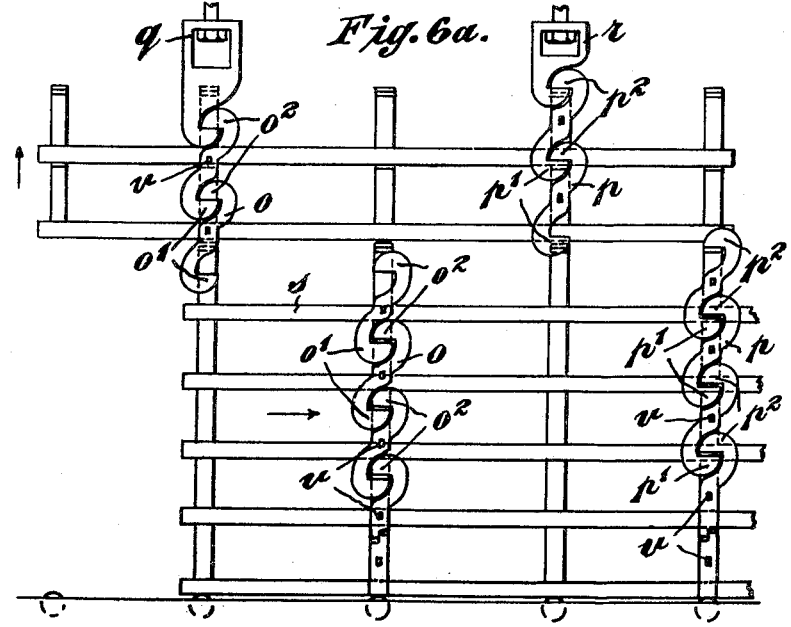

In the embodiment shown in FIGURE 6 each pallet is provided on its sides with two forwardly and rearwardly facing hook members indicated by *o* and *o*$^1$ and *p, p*$^1$ and the hook members on one pallet co-operate with the hook members of the lower pallet and a space is left between the hook formations indicated by *o*$^2$, *p*$^2$. In this embodiment the hook members are directly attached to the pallets as indicated by the squares V and one sequence of hook members occupies an elevated position with respect to the complementary series. The pallets are lifted by the hook members from the points *q* and *r* and a gap *o*$^2$, *p*$^2$ is left in each instance and so that the weight of the upper pallets is sequentially taken and the lower pallet, as for instance pallet *s*, FIGURE 6, can be withdrawn in the direction of the arrow by virtue of the one hook member *o*$^1$ passing beneath the other hook members marked *p*$^1$. If desired instead of providing fulcrums for the pallets at their rear, see FIGURE 1, the pallets may be raised at each extremity by ladder devices such as *k*.

I claim:

1. Apparatus for storing and handling materials comprising a plurality of pallets disposed in stacked relationship; each pallet having means for supporting another of said pallets directly above in said stack; roller means supporting a bottom pallet of said plurality of pallets for lateral movement; each of said pallets having engageable means projecting therefrom; and lifting and supporting means adapted to successively lift said plurality of pallets from an uppermost one downwardly; said lifting means including engaging means for each of said pallets registering with but spaced from said engageable means of each of said pallets and means for moving said engaging means for said uppermost pallet upwardly into engagement with said engageable means of said uppermost pallet; each of said engaging means for an upper pallet in said stack being operative to move the engaging means of a next lower pallet into engagement with its corresponding engageable means after engagement occurs for said upper pallet.

2. Apparatus for storing and handling materials comprising a plurality of pallets disposed in stacked relationship; each pallet having means for supporting another of said pallets directly above in said stack; roller means supporting a bottom pallet of said plurality of pallets for lateral movement; each of said pallets having engageable means projecting therefrom; and lifting and supporting means adapted to successively lift said plurality of pallets from an uppermost one downwardly; said lifting means including engaging means for each of said pallets registering with but spaced from said engageable means of each of said pallets and means for moving said engaging means for said uppermost pallet upwardly into engagement with said engageable means of said uppermost pallet; each of said engaging means for an upper pallet in said stack being operative to move the engaging means of a next lower pallet into engagement with its corresponding engageable means after engagement occurs for said upper pallet; said engaging means for said plurality of pallets including a vertical member disposed adjacent said stack of pallets; said vertical member having a lifting element for each engageable means of each pallet; each lifting element being disposed closer to its corresponding engageable means than the next lower lifting element to its corresponding engageable means.

3. Apparatus for storing and handling materials comprising a plurality of pallets disposed in stacked relationship; each pallet having means for supporting another of said pallets directly above in said stack; roller means supporting a bottom pallet of said plurality of pallets for lateral movement; each of said pallets having engageable means projecting therefrom; and lifting and supporting means adapted to successively lift said plurality of pallets from an uppermost one downwardly; said lifting means including engaging means for each of said pallets registering with but spaced from said engageable means of each of said pallets and means for moving said engaging means for said uppermost pallet upwardly into engagement with said engageable means of said uppermost pallet; each of said engaging means for an upper pallet in said stack being operative to move the engaging means of a next lower pallet into engagement with its corresponding engageable means after engagement occurs for said upper pallet; said engaging means for said plurality of pallets including a vertical member disposed adjacent said stack of pallets; said vertical member having a lifting element for each engageable means of each pallet; each lifting element being disposed closer to its corresponding engageable means than the next lower lifting element to its corresponding engageable means; said lifting and supporting means also including fulcrum means disposed below and spaced from the rear edge of each of said pallets whereby the lifting of a forward extremity of each pallet causes the rear edge of said pallet to contact and rest on said fulcrum means.

4. Apparatus for storing and handling materials comprising a plurality of pallets disposed in stacked relationship; each pallet having means for supporting another of said pallets directly above in said stack; roller means supporting a bottom pallet of said plurality of pallets for lateral movement; each of said pallets having engageable means projecting therefrom; and lifting and supporting means adapted to successively lift said plurality of pallets from an uppermost one downwardly; said lifting means including engaging means for each of said pallets registering with but spaced from said engageable means of each of said pallets and means for moving said engaging means for said uppermost pallet upwardly into engagement with said engageable means of said uppermost pallet; each of said engaging means for an upper pallet in said stack being operative to move the engaging means of a next lower pallet into engagement with its corresponding engageable means after engagement occurs for said upper pallet; said engaging means for said plurality of pallets including a vertical member disposed adjacent said stack of pallets; said vertical member having a lifting element for each engageable means of each pallet; each lifting element being disposed closer to its corresponding engageable means than the next lower lifting element to its corresponding engageable means; said engageable means for each pallet including an L-shaped projection attached to the side of said pallet providing a rearwardly extending finger for engagement.

5. Apparatus for storing and handling materials comprising a plurality of pallets disposed in stacked relationship; each pallet having means for supporting another of said pallets directly above in said stack; roller means supporting a bottom pallet of said plurality of pallets for lateral movement; each of said pallets having engageable means projecting therefrom; and lifting and supporting means adapted to successively lift said plurality of pallets from an uppermost one downwardly; said lifting means including engaging means for each of said pallets registering with but spaced from said engageable means of each of said pallets and means for moving said engaging means for said uppermost pallet upwardly into engagement with said engageable means of said uppermost pallet; each of said engaging means for an upper pallet in said stack being operative to move the engaging means of a next lower pallet into engagement with its corresponding engageable means after engagement occurs for said upper pallet; said engaging means for said plurality of pallets including a vertical member disposed adjacent said stack of pallets; said vertical member having a lifting element for each engageable means of each pallet; each lifting element being disposed closer to its corresponding engageable means than the next lower lifting element to its corresponding engageable means; said engageable means for each pallet including an L-shaped projection attached to the side of said pallet providing a rearwardly extending finger for engagement; said lifting and supporting means also including fulcrum means disposed below and spaced from the rear edge of each of said pallets whereby the lifting of a forward extremity of each pallet causes the rear edge of said pallet to contact and rest on said fulcrum means.

6. Apparatus for storing and handling materials comprising a plurality of pallets disposed in stacked relationship; each pallet having means for supporting another of said pallets directly above in said stack; roller means supporting a bottom pallet of said plurality of pallets for lateral movement; each of said pallets having engageable means projecting therefrom; and lifting and supporting means adapted to successively lift said plurality of pallets from an uppermost one downwardly; said lifting means including engaging means for each of said pallets registering with but spaced from said engageable means of each of said pallets and means for moving said engaging means for said uppermost pallet upwardly into engagement with said engageable means of said uppermost pallet; each of said engaging means for an upper pallet in said stack being operative to move the engaging means of a next lower pallet into engagement with its corresponding engageable means after engagement occurs for said upper pallet; said engageable means for each pallet including a downwardly-depending forwardly-opening hook member; said engaging means for each pallet including an upwardly-extending, rearwardly-opening hook member, the forwardly-opening member of a pallet registering with but spaced from a rearwardly-opening member of a next lower pallet.

References Cited in the file of this patent
UNITED STATES PATENTS

| | | |
|---|---|---|
| 1,084,630 | Hawthorn | Jan. 20, 1914 |
| 1,202,706 | Grehan | Oct. 24, 1916 |
| 2,701,065 | Bertel | Feb. 1, 1955 |
| 2,769,559 | Johnson | Nov. 6, 1956 |